United States Patent [19]
Vahldieck

[11] 3,926,794
[45] Dec. 16, 1975

[54] WARM SLUDGE DIGESTION WITH OXYGEN

[75] Inventor: Nathan P. Vahldieck, Snyder, N.Y.

[73] Assignee: Union Carbide Corporation, New York, N.Y.

[22] Filed: June 28, 1974

[21] Appl. No.: 484,255

[52] U.S. Cl. .................. 210/5; 210/7; 210/12; 210/15
[51] Int. Cl.² .......................................... C02C 1/06
[58] Field of Search ..................... 210/4–8, 12, 210/14, 15, 195, 220, 194, 196, 221; 71/9

[56] References Cited
UNITED STATES PATENTS

| 3,025,151 | 3/1962 | Berg et al. .................................. 71/9 |
| 3,357,812 | 12/1967 | Snell .......................................... 71/9 |
| 3,547,815 | 12/1970 | McWhirter ............................. 210/15 |
| 3,660,277 | 5/1972 | McWhirter et al. .................. 210/15 |
| 3,670,887 | 6/1972 | McWhirter ............................. 210/5 |

Primary Examiner—Thomas G. Wyse
Assistant Examiner—Benoit Castel
Attorney, Agent, or Firm—John C. LeFever

[57] ABSTRACT

Oxygen gas is used for digestion of activated sludge in a warm covered zone and the off-gas is used as at least the major part of the aeration gas in a cooler covered zone for secondary treatment of wastewater.

10 Claims, 17 Drawing Figures

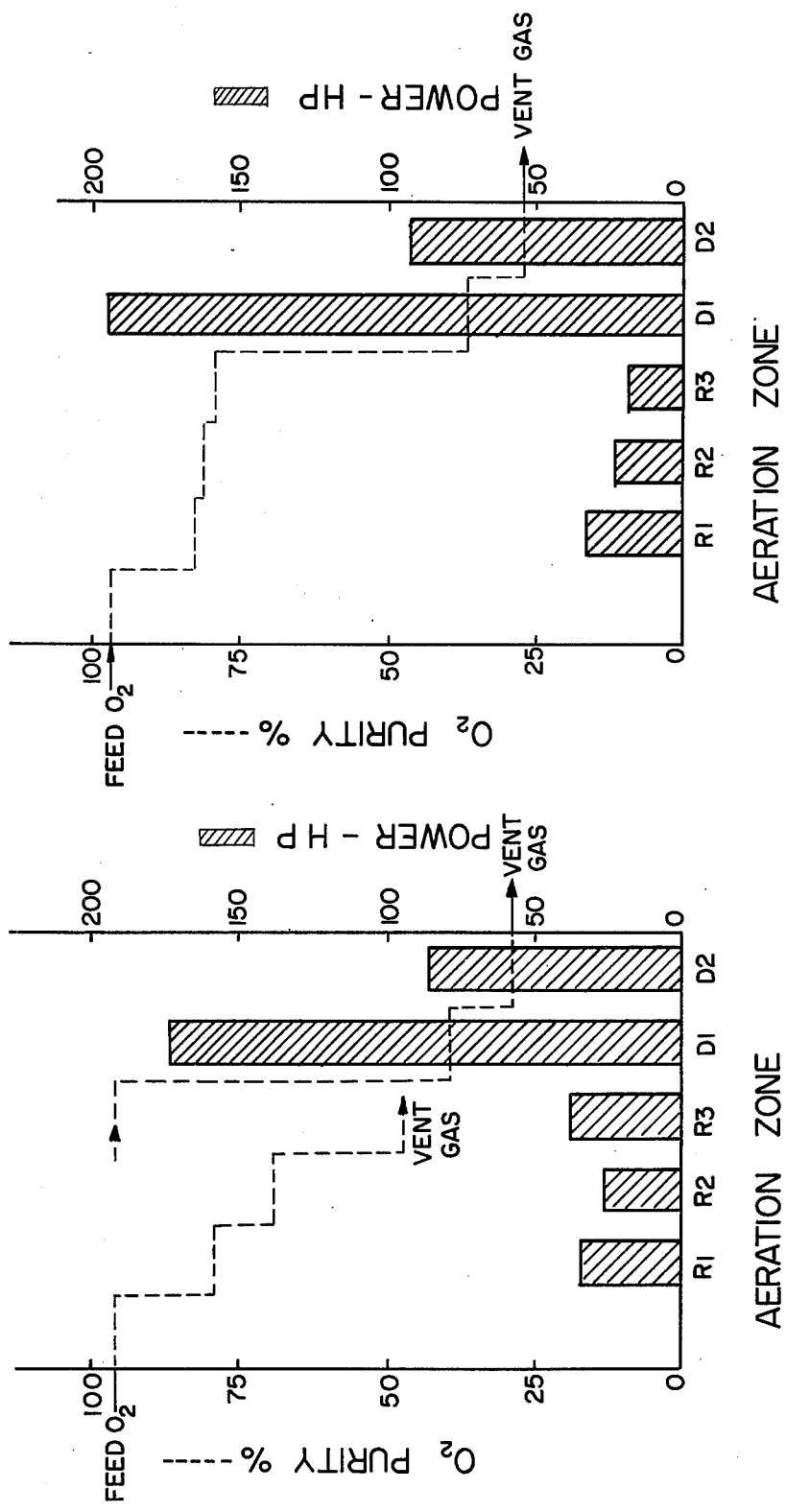

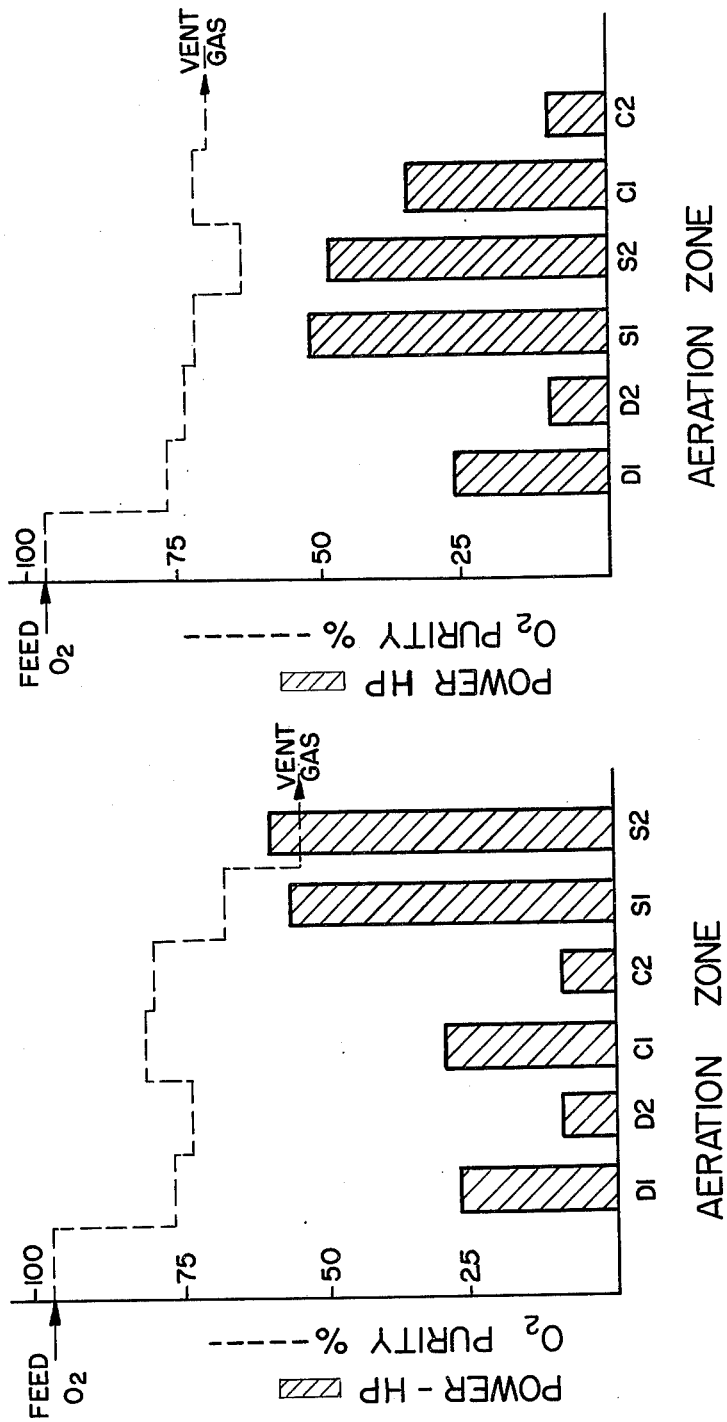

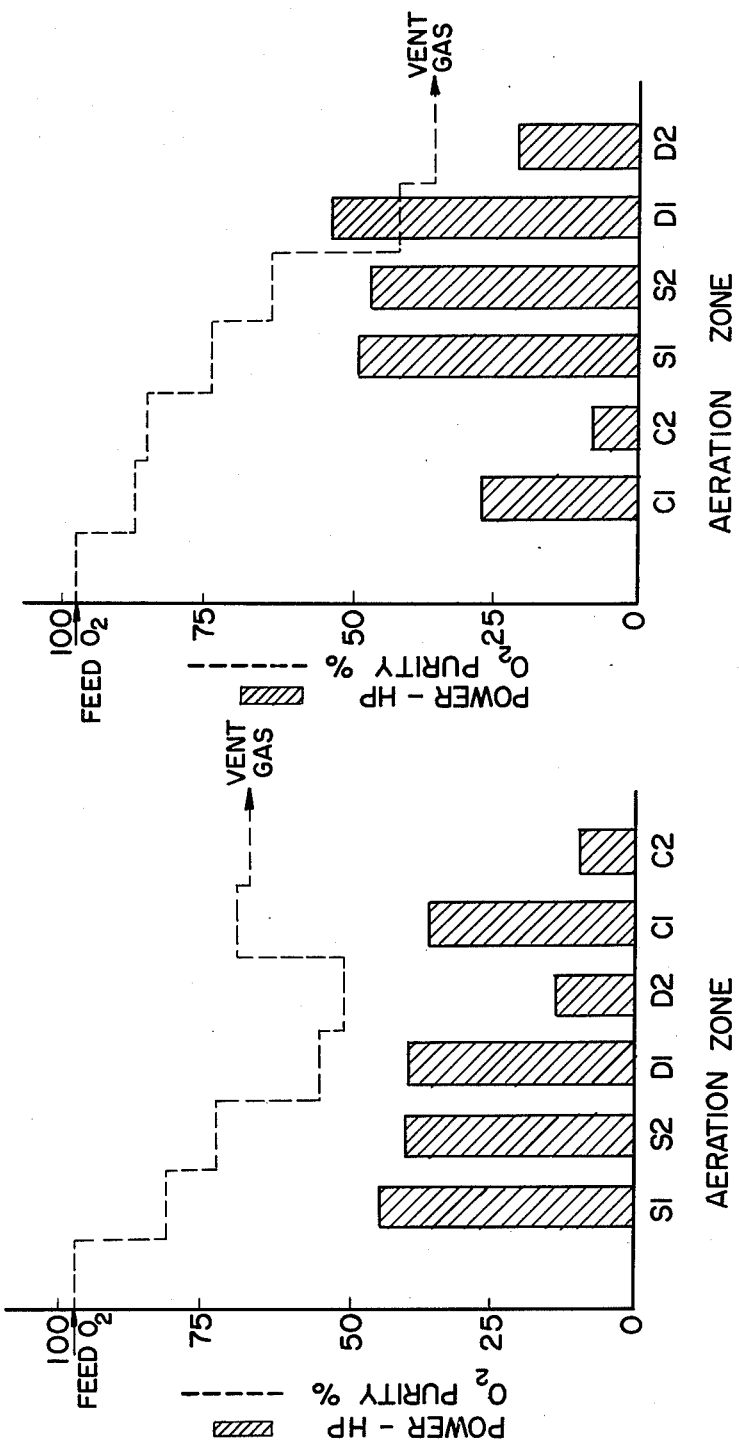

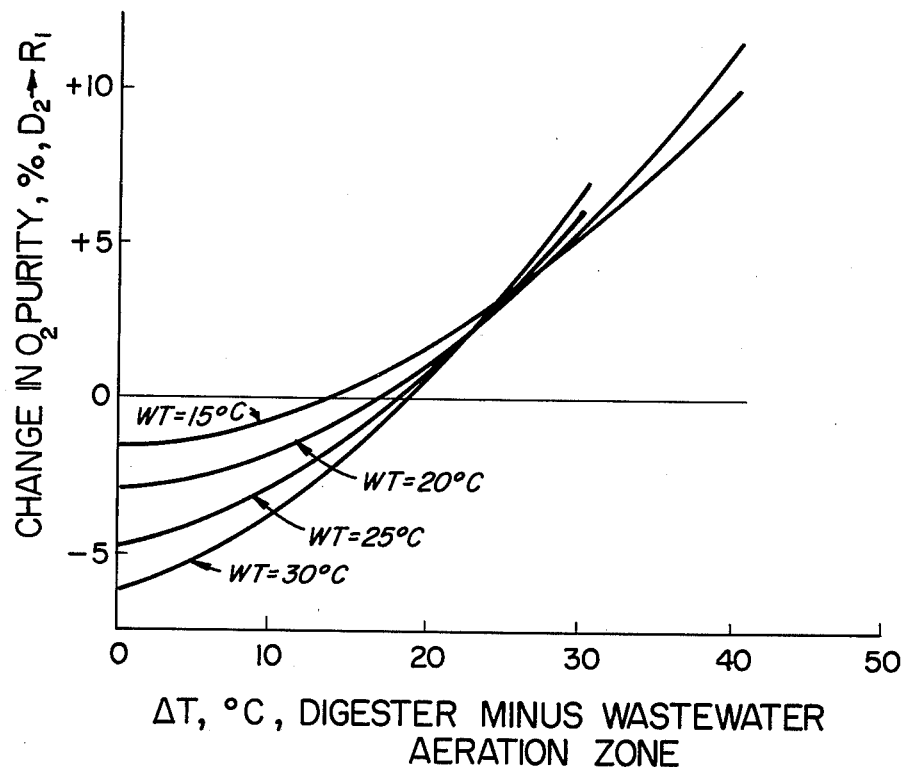
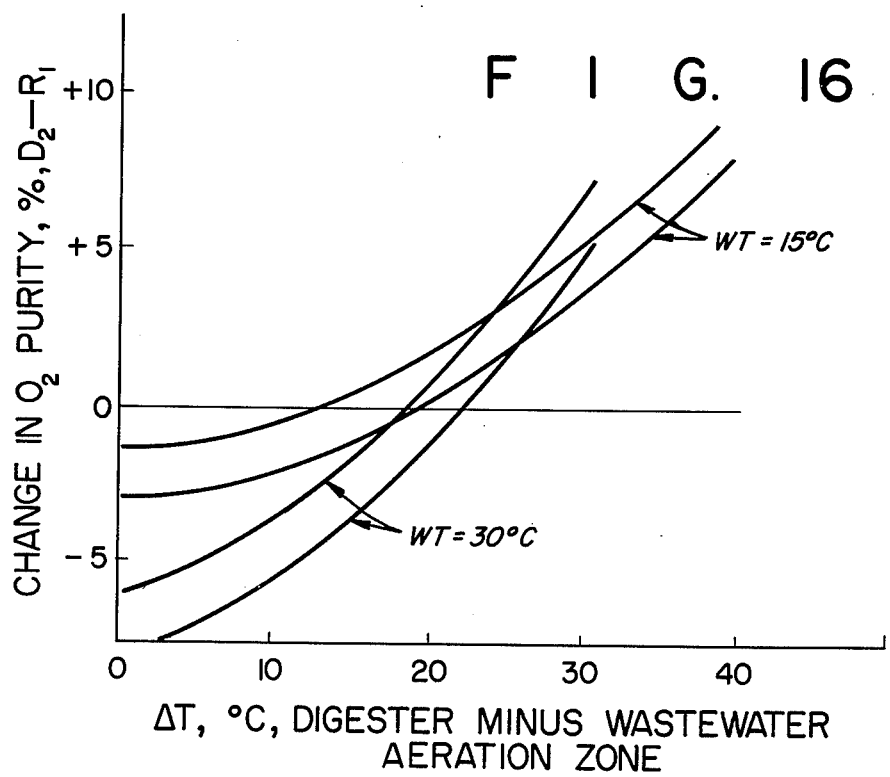

WARM SLUDGE DIGESTION WITH OXYGEN

BACKGROUND OF THE INVENTION

This invention relates to a process for integrated aeration of BOD-containing water and warm aerobic digestion of activated sludge with oxygen.

U.S. Pat. No. 3,670,887 to J. R. McWhirter describes an improved system for aeration of wastewater and aerobic digestion of the activated sludge with at least 60% oxygen gas in which the latter is fed to the covered wastewater aeration zone and unconsumed oxygen containing gas discharged therefrom is supplied to the covered aerobic digestion zone as at least part of the latter's required oxygen. Integration of the oxygen-consuming zones in this manner provides aeration gas of higher oxygen purity and requires less dissolution energy throughout the system as compared to separate oxygen feeds to each zone.

It is known that aerobic digestion proceeds more rapidly at elevated temperatures. As temperature rises from 35°C, the mesophilic microorganisms decline and the thermophilic forms increase. The temperature range of 45°C to 75°C is often referred to as the thermophilic range where thermophils predominate and where most mesophils are extinct. Above this range, the thermophils decline, and at 90°C, the system becomes essentially sterile. Because of the more rapid oxidation of sludge, thermophilic digestion achieves more complete removal of biodegradable volatile suspended solids (VSS) than the same period of digestion at ambient temperature. A more stable residue is obtained which can be disposed of without nuisance. It is also reported that thermophilic digestion effectively reduces or eliminates pathogenic bacteria in the sludge, thereby avoiding a potential health hazard associated with its disposal.

When diffused air systems are used to supply oxygen for digestion, the heat losses tend to be very large. Air contains only 21% oxygen and only about 5–10% of the oxygen component is dissolved. As a result, a very large quantity of air must be used to supply the oxygen requirements, and the sensible heat of the "spent" air and the latent heat required to saturate the spent air with water vapor are substantial. At ambient temperature (20°C or lower), sludge residence time in aerobic digestion with air is typically 12–20 days and huge tanks are required to retain the sludge. Even though steps are taken to suppress the rate of heat losses by conduction, convection and radiation, the large exposed area for heat transfer results in heavy heat losses. Finally, sludge produced in airaerated wastewater treatment is typically "thin" (relatively dilute). This further increases heat losses by conduction, convection and radiation. More importantly, a larger quantity of water accompanies the sludge through the digester, and the sensible heat lost in the outflowing treated sludge is very great.

As a result of the above listed heat losses in air digestion, autothermal heat effects are minor, and an uneconomical quantity of external heat is needed to sustain temperatures at beneficial levels.

It is known that the heat losses in aerobic digestion can be greatly reduced by using oxygen-enriched gas rather than air. If the oxygen is utilized effectively, the amount of gas which must be fed to and vented from the digester is considerably smaller compared to air, because much or all of the nitrogen has been preliminarily removed. Heat losses due to sensible warmup of the gas and to water evaporation into the gas are decreased. The excess sludge produced in wastewater treatment with oxygen is more concentrated than that produced in air treatment and less heat is lost by conduction and radiation from the digester tank and by heat content of treated sludge leaving the digester. These reductions in heat losses are sufficient so that autothermal heat alone is able to sustain temperature at levels appreciably higher than ambient.

It has been found that wastewater treatment systems employing oxygen rather than air as the aeration gas as for example described in the McWhirter et al. U.S. Pat. Nos. 3,547,812, 3,547,813 and 3,547,815 are particularly useful for conducting sludge digestion at elevated temperature. The high oxygen utilization achievable in these systems minimizes heat losses by virtue of the aeration gas, and the characteristically high sludge (solids) concentrations minimize other heat losses experienced during treatment and by virtue of reduced volume of treated sludge discharge. Accordingly, sludge digestion with oxygen gas should be highly conducive to the maintenance of elevated temperatures autothermally (without external heat introduction) even during periods of low ambient temperature.

However, it has also been found that serious mass transfer problems arise when attempting to conduct sludge digestion using oxygen-enriched gas at elevated temperature. The high driving forces for mass transfer which normally characterize the oxygen-aerated process tend to be reduced. Although driving forces for mass transfer may be held substantially higher than obtainable with air, they are nevertheless seriously reduced below values characteristic of ambient temperature digestion with oxygen. Power requirement for dissolution is considerably greater than desired, and/or uneconomical quantities of unconsumed oxygen must be vented in order to maintain favorably high oxygen partial pressures in the aeration gas.

The rate of $O_2$ dissolution $W$ can be expressed as follows:

$$W = K_L a\ [(H_{O2} \cdot P \cdot Y_{O2}) - DO\ ]$$

where
$K_L$ = mass transfer coefficient for the controlling liquid film at the gas-liquid interface
$a$ = interfacial area (gas-liquid)
$H_{O2}$ = Henry's Law constant for oxygen
$p$ = total pressure on the system
$Y_{O2}$ = mole fraction of $O_2$ in the gas phase
$DO$ = dissolved oxygen concentration Even at ambient temperature, mass transfer in the digester is more difficult than in wastewater treatment for two reasons. First, the liquid phase mass transfer coefficient $K_L$ tends to drop as solids concentration increases, other factors remaining constant. While higher temperature exerts the opposite effect on $K_L$, the high solids level in a digester processing oxygen-aerated sludge typically overwhelms the temperature effect and produces a net adverse effect on $K_L$. This means that more power must be expended both for mixing and for production of interphase surface area $a$ in order to avoid a drop in rate of $O_2$ dissolution and in DO level.

Second, the heavy evolution of $CO_2$ from the sludge greatly dilutes the oxygen in the aeration gas. The liquid (water) flow rate through the digester is very low compared to that in the wastewater treatment step, yet the quantity of organic material oxidized in digestion is comparable to that oxidized in wastewater treatment. Consequently, $CO_2$ is produced in large quantity, and a smaller fraction of the $CO_2$ can be held in the liquid phase of the digester and considerably more will evolve into the gas. At elevated temperatures, the $CO_2$ problem is further aggravated by a significant reduction in $CO_2$ solubility in the liquid. The evolution of $CO_2$ reduces the oxygen concentration $Y_{O2}$ in the gas phase.

At elevated temperature, oxygen mass transfer is additionally complicated by further loss of driving force associated with a reduction in the Henry's Law constant for oxygen $H_{O2}$. For example, if 20°C tap water is in equilibrium with 100% oxygen ($Y_{O2} = 1.0$) at one atmosphere total pressure ($p = 1.0$), 44 mg/l $O_2$ will dissolve, but only about 30 mg/l will dissolve at a temperature of 50°C. Thus, for a desired DO of 5 mg/l the loss in $O_2$ solubility alone reduces driving force at 50°C to only $$\frac{30-5}{44-5} \times 100\% = 64\%$$

of the driving force at 20°C.

In addition, driving force for mass transfer is lost at elevated temperature because of the higher water content of the aeration gas. The vapor pressure of water at 50°C is over 5 times that at 20°C, and at 50°C, water vapor may comprise 10–15% of the aeration gas. The combined dilution effects of $CO_2$ and $H_2O$ greatly diminish the concentration of $O_2$ over the liquid, i.e., the value of the factor $Y_{O2}$ of the foregoing equation is greatly reduced.

Because of the above factors, it has been found that the advantages of the integrated gas system of U.S. Pat. No. 3,670,887 are virtually eliminated when the digester operates at elevated temperature. As digester temperature rises, the power and oxygen utilization values approach those obtainable with separate oxygen feeds to the two steps.

An object of this invention is to provide an improved method for integrating a wastewater treatment — warm sludge digestion system employing oxygen aeration gas.

Another object of this invention is to provide an improved oxygen aerated, wastewater treatment — warm sludge digestion system with lower power consumption.

Still another object of this invention is to provide an improved oxygen aerated, wastewater treatment — warm sludge digestion system with higher oxygen utilization.

Other objects and advantages of this invention will be apparent from the ensuing disclosure and appended claims.

SUMMARY

This invention relates to a method for integrating aeration of BOD-containing water and warm aerobic digestion of activated sludge with oxygen.

It has unexpectedly been discovered that when oxygen gas is first introduced to the warm covered digestion zone and the $O_2$ partially depleted gas discharge therefrom is introduced to the covered wastewater aeration zone as at least the major part of the required oxygen, all at specified conditions, the oxygen purity of the aeration gas in the last-mentioned zone increases substantially as compared with the gas entering from the digestion zone. One of the essential conditions for achieving this oxygen purity jump is that the sludge temperature in the digestion zone be at least 10°C warmer than the liquor temperature in the aeration zone. The oxygen-purity of the wastewater aeration gas increases above that of the incoming off-gas from the digestion zone because $CO_2$ and water vapor are rapidly absorbed into the liquor. The larger flow of water in the wastewater aeration zone, as compared to the digestion zone, has a huge capacity for dissolving $CO_2$ and quickly reducing the $CO_2$ content of the incoming gas. The lower temperature of the liquor in the wastewater aeration zone results in a much lower water vapor pressure than that in the digestion zone and the water content of the incoming gas is rapidly reduced by condensation. By way of example, in one instance wherein the entire $O_2$ supply to the wastewater reactor is furnished by the digester off-gas and contains 61% $O_2$, the aeration gas in the overhead space within the enclosed wastewater aeration zone contains 78% $O_2$. The substantial increase in oxygen purity in the wastewater aeration zone gas provides a relatively high oxygen partial pressure which in turn allows satisfaction of the high $O_2$ consumption rate required in this zone at very modest power requirements compared to prior art wherein either separate oxygen feed gas streams are fed to the two zones or the oxygen feed gas is first introduced to the wastewater aeration zone and the off-gas therefrom transferred to a warm digestion zone.

The present invention offers substantial power savings. By ways of example, in one instance the total dissolution energy for this invention, the wastewater aeration-to-digester gas flow system and the separate oxygen feeds system are respectively 163, 205 and 243 HP.

More specifically, this invention relates to a method for BOD-removal from wastewater in a covered aeration zone and activated sludge digestion in a covered digestion zone by aeration with oxygen gas. First gas comprising at least 40% oxygen (by volume) is introduced into the covered aeration zone where it forms gas which is mixed with the wastewater and recycled sludge in the covered aeration zone and one of the fluids in such zone is simultaneously continuously recirculated against the other fluid in sufficient quantity and rate to maintain the dissolved oxygen content (DO) of the mixed liquor at least at 0.5 mg/l and the liquid temperature is maintained at least at 15°C. The mixed liquor is separated into purified liquid and activated sludge, and unconsumed oxygen-containing gas is discharged from the aeration zone at rate such that its oxygen content is no more than 40% of the total oxygen introduced to the digestion zone. Part of the activated sludge is then returned to the aeration zone as the aforementioned recycled sludge.

Second gas comprising at least 80% oxygen (by volume) and sufficient in quantity to provide part of the aforementioned first gas is introduced along with the unreturned activated sludge to the enclosed digestion zone. They are mixed therein and one of the fluids simultaneously recirculated against the other fluid in the digestion zone in sufficient quantity to maintain the dissolved oxygen content of sludge at least at 2 mg/l, and the total suspended solids content (MLSS) of the sludge at least at 15,000 mg/l. During this step, the sludge is maintained at temperature of at least 25°C and at least 10°C warmer than the wastewater aeration zone liquor temperature, but below 75°C.

The digestion zone mixing and fluid recirculation are continued for sufficient duration to oxidize at least 60% of the biodegradable volatile suspended solids content of the sludge introduced to the digestion zone. Thereafter at least partially oxidized sludge and oxygen-partially depleted digestion gas of at least 40% oxygen purity are separately discharged at rate such that the oxygen content of the gas is at least 35% of the oxygen content of the second gas entering the digestion zone.

The aforementioned oxygen-depleted gas discharge from the digestion zone is then provided as at least the major part of the first gas introduced to the wastewater aeration zone.

BRIEF DESCRIPTION OF THE DRAWINGS

FIG. 7 is a graph showing the distribution of $O_2$ purities in the aeration gas and dissolution power consumption through an oxygen aerated wastewater — warm aerobic digestion system with separate $O_2$ supplies to the wastewater treatment and warm digestion zones.

FIG. 8 is a graph similar to FIG. 7 but based on series flow of the entire oxygen supply first to the aeration zone and then to the warm digestion zone.

FIG. 11 is a graph similar to FIG. 7, but based on a contact-stabilization type of aeration zone with oxygen aeration gas flowing consecutively through the digestion, contact sub-zone and stabilization sub-zone.

FIG. 12 is another graph similar to FIG. 11 but based on oxygen aeration gas consecutively flowing through the contact sub-zone, stabilization sub-zone, and the digestion zone.

FIG. 13 is another graph similar to FIG. 11 wherein the oxygen aeration gas flows consecutively through the stabilization sub-zone, digestion zone, and contact sub-zone.

FIG. 14 is another graph similar to FIG. 11 with the oxygen aeration gas flowing consecutively through the digestion zone, stabilization sub-zone, and contact sub-zone.

FIG. 15 is a graph showing the effect of varying the wastewater liquor temperature on the digester-to-wastewater aeration zone oxygen gas purity differential.

FIG. 16 is a graph similar to FIG. 15 but showing the effect of alkalinity on the aforementioned oxygen gas purity differential.

DESCRIPTION OF PREFERRED EMBODIMENTS

Figure 1:
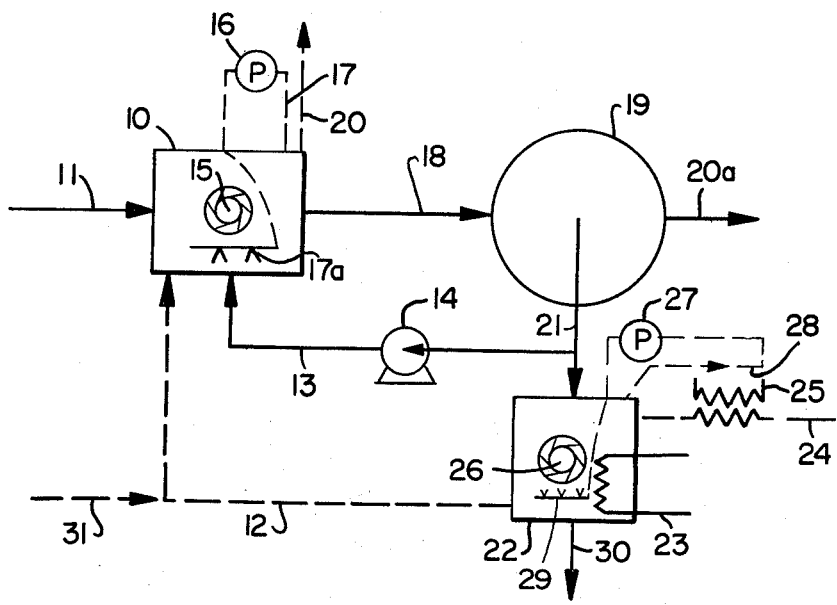
FIG. 1 is a schematic flowsheet of apparatus arranged for practicing the method of this invention with separate wastewater treatment and sludge digestion zones.

Referring now to FIG. 1, BOD-containing water as for example sewage enters aeration zone 10 through conduit 11. First gas comprising at least 40% oxygen (by volume) enters zone 10 through conduit 12 (dotted-line) and recycled activated sludge also enters zone 10 through conduit 13 having pump 14 therein. In this and succeeding figures, liquid and solid flowing-conduits are shown by solid lines whereas gas flowing-conduits are shown by dotted lines. For purposes of simplicity, valves are not illustrated, but the appropriate use of same in practicing the invention will be well understood by those skilled in the art.

The aforementioned streams are intimately mixed in aeration zone 10 by mechanical agitation means 15. The latter may comprise motor-driven impellers located near the liquid surface or submerged below the surface, and the oxygen gas may be introduced through conduit 12 either above or below the liquid. Such apparatus is well known to those skilled in the art and should be selected to achieve high contact area between the fluids with minimal work expenditure. If the oxygen gas is sparged or diffused into the liquid, the bubbles should be small so that their total surface area is large and their buoyancy is low. Dissolution of oxygen is also aided by submerging the gas dispersion means to a depth in the liquid where the hydrostatic effect is significant.

Means are provided for continuously recirculating one fluid against the other fluids in aeration zone 10. For example pump 16 joined to the gas space by conduit 17 recirculates aeration gas to the lower portion of the zone for release as small gas bubbles through sparger 17a. Aerating devices are commonly rated by the so-called "air standard transfer efficiency" which identifies the capability of the device to dissolve oxygen from air into zero - DO tap water at one atmosphere pressure and 20°C. Suitable devices are those which have an air standard transfer efficiency of at least 1.5 lb. $O_2$ per HP-hr and preferably at least 3.0. For these purposes the power used in rating the device is the total power consumed both for agitating the liquor and for gas-liquor contacting.

The aforementioned oxygen is introduced and one of the fluids is simultaneously continuously recirculating against the other fluids in sufficient quantity and rate to maintain the dissolved oxygen content (DO) of the mixed liquor at least at 0.5 mg/l. Also, the liquor temperature is maintained at least at 15°C. so that means may be needed in cold weather to prevent lower temperature in zone 10, for example, means for heating the incoming wastewater in conduit 11. Design and operation of wastewater aeration zone 10 may be as described in any of U.S. Pat. Nos. 3,547,811, 3,547,812 or 3,547,815, but co-current flow of gas and liquor through at least two sub-zones (as described in the last-mentioned patent) is preferred for reasons discussed hereinafter.

The oxygenated mixed liquor is discharged from covered aeration zone 10 and passed through conduit 18 for separation into purified supernatant liquid and activated sludge in clarifier 19. Unconsumed oxygen-containing gas is discharged from aeration zone 10 through conduit 20 and may for example be vented to the atmosphere. This gas is discharged from the aeration zone at rate controlled so that its oxygen content is no more than 40% of the total oxygen introduced to the covered digestion zone (discussed hereinafter). Returning now to clarifier 19, supernatant purified liquid is discharged through conduit 20a and activated sludge drawn off through conduit 21 containing concentrated microorganisms in the concentration of about 15,000 – 14,000 mg/l total suspended solid content (MLSS). The major part of the activated sludge, eg. at least 85% is returned through conduit 13 and pump 14 to the aeration zone, preferably at a flow rate relative to the BOD-containing wastewater such that the recirculating sludge/BOD containing wastewater volume ratio is 0.1 to 0.5. The flow rates into the covered aeration zone 10 are preferably such that the total suspended solid concentration (MLSS) is 4,000 – 12,000 mg/l and the volatile suspended solid content (MLVSS) is 3,000 – 10,000 mg/l. The liquid-solid contact time in aeration zone 10 for organic food absorption-assimilation is between 30 minutes and 24 hours. This time varies depending upon the strength (BOD-content) of the wastewater, the type of pollutant, solids level in aeration and temperature, all of which is understood by those skilled in the art.

Not all the sludge separated in clarifier 19 is returned to the aeration zone 10 for two reasons. First, the activated sludge process produces a net yield of microorganisms because the mass of new cells synthesized from impurities in the wastewater is greater than the mass of cells autooxidized during treatment. Second, the wastewater normally contains non-biodegradable solids which settle and accumulate with the biomass. Therefore, a small fraction of the activated sludge must be discarded in order to balance the microorganism population and the food (BOD) supply and in order to suppress the accumulation of inert solids in the system. Sludge wasting will usually comprise less than 3% of the total separated sludge and rarely more than 15%.

While the waste sludge is a small fraction of the total solids separated in the clarifier, it nevertheless is often a large absolute quantity of material. Regardless of quantity, its disposition represents a significant part of the cost of wastewater treatment, and in addition, poses a serious ecological problem. The sludge is putrescible and is highly active biologically, and often contains pathogenic bacteria. Potentially, the sludge is useful as fertilizer and/or land fill, but before such use, it must be well stabilized to avoid nuisance and health hazards, and its high water content (e.g. 96–98%) must be reduced.

Part of the sludge in conduit 21 is introduced to covered heated digestion zone 22 either continuously or intermittently. Its temperature is initially about the same as the wastewater in aeration zone 10, i.e. at least 15°C, but is warmed to at least 25°C and in any event, at least 10°C warmer than the liquor in zone 10, but below 75°C, preferably between about 55° and 65°C. It is difficult to maintain digestion temperatures above 65°C autothermally. The lower absolute temperature limit of zone 22 and the temperature difference are necessary to achieve the oxygen aeration gas purity increase in the aeration zone and the upper limit is based on sludge partial sterilization at about 75°C and the unjustified higher power requirements for heating sludge above this level. The elevated temperature in covered digestion zone 22 can be obtained by supplying external heat, as for example by a suitable heated fluid circulating in heat exchange means 23. Because of the coating and plugging tendency of the solids, heat transfer surfaces disposed within the digester should not be intricate or closely spaced and may advantageously be embedded in or bonded to the wall of the tank.

Second oxygen gas comprising at least 80% oxygen (by volume) is introduced to covered heated digestion zone 22 through conduit 24. As discussed hereinafter, this gas is sufficient in quantity to provide part of the first oxygen gas introduced to aeration zone 10 through conduit 12. Heat exchange fouling problems in heated digestion zone 22 can be minimized or possibly avoided by warming the inflowing second oxygen gas by external heating means 25. Also, if the aeration gas is recirculated to the digestion zone, the recirculation gas stream may be heated.

Preferably, the elevated temperature in covered digestion zone 22 is obtained autothermally without need for heat exchangers such as 23 and 25. The concentrated sludge characteristically obtained in the oxygen aeration process of U.S. Pat. 3,547,813 is very favorable to autothermal operation because of the reduced water content relative to biodegradable "fuel" content. Moreover, high solids concentrations reduce digester size and hence reduce conductive heat losses through the walls of the digester tank. As previously indicated, the total suspended solids content (MLSS) of the sludge in the digestion zone should be at least 15,000 mg/l and preferably at least 20,000 mg/l to achieve the minimum 10°C ΔT between the wastewater aeration zone liquor and the digestion zone sludge. In one test in which the wastewater aeration zone temperature was 19°C, a digestion zone temperature of 33°C was reached autothermally with about 2% solids (20,000 mg/l) and with 7 days sludge retention time. The ΔT was 14°C; it appears that 15,000 mg/l suspended solids content in the digestion zone would have provided about 10°C ΔT, particularly if the digestion zone had been reduced in size to provide a retention time closer to optimum for this sludge.

Upper limits on digester solids concentration are imposed by two factors. Broadly, the maximum concentration depends upon capability of sedimentation and thickening devices to reduce water content. Flotation devices, centrifugal separators, and gravity thickner often produce 50,000 mg/l concentration. Solids levels can be further increased by admixture of primary sludge or concentrated waste from a source other than the wastewater. The second factor which limits solids concentrations is the increasing difficulty in dissolving oxygen and mixing solids in the digester. A preferred upper limit is 50,000 mg/l to insure adequate DO uniformly distributed through the sludge. Moreover, in most uses of the invention, temperatures corresponding to near-maximum rates of digestion can be reached autothermally at solids levels no higher than 50,000 mg/l. Further increase in solids concentration would shift more $CO_2$ into the gas space of the digester and unnecessarily reduce the oxygen partial pressure of the gas.

Digester tank construction also affects autothermal temperature levels and concrete walls are preferred over metal because of the lower conductive heat loss through concrete. Heat loss can be further reduced by embedding the tank below grade and mounding earth against any exposed vertical wall of the tank. Thermal insulation such as low-density concrete or foamed plastic can be applied over a metal cover if required.

It is also preferable to practice the invention in digesters having a surface-to-volume ratio less than 0.8 ft$^2$/ft$^3$ (2.62 m$^2$/m$^3$). For these purposes, "surface" refers to the entire wall surface area of the covered digester including top, bottom and side walls. Surface-to-volume ratios larger than 0.8 result in large heat conduction losses through the walls in relation to the quantity of heat generated in the digester. Such heat loss is likely to necessitate thermal insulation on walls exposed to ambient atmosphere. In addition, larger surface-to-volume ratios usually imply digester tanks with narrow dimensions which are difficult to aerate and mix uniformly.

Retention time of the sludge in the digester also affects the autothermal temperature levels which can be maintained. It will be appreciated that numerous factors enter the relationship of retention time and temperature, such as degradability of the sludge and strength (solids level) of the sludge. However, in general, the sludge should be retained at least 2 days in order to oxidize sufficient of its VSS so that the heat generated offsets the cooling effect of the sludge entering the digester. Preferably, the retention time is at least 3 days, not only to maximize temperature, but also to better stabilize the solids for disposal. Excessively long retention time also reduces autothermal temperature level and additionally represents an unnecessary expenditure for tankage and mixing. For typical sludges, adequate stabilization is achieved within 3–10 days, and retention beyond 10 days usually results in lower temperature. The latter effect occurs because after extended oxygenation, the fuel value of the sludge becomes depleted and it contributes heat at decreasing rate, whereas the conductive and evaporative heat losses associated with its volume and retention time within the tank remain high. Sludges produced from wastewater having a high municipal component and without rate-inhibiting impurities can usually be stabilized satisfactorilly in 3–7 days.

Digestion zone 22 is provided with mechanical agitation means 26 which may be the same type employed as means 15 in aeration zone 10. Also, means are provided for continuously recirculating one fluid against the other fluids, as for example pump 27 joined to the gas space by conduit 28 for recirculating aeration gas to the lower portion of the zone for release as small gas bubbles through sparger 29.

The second gas comprising at least 80% oxygen is introduced to the covered digestion zone 22 in sufficient quantity and rate to maintain the dissolved oxygen content of the sludge at least at 2 mg/l. As digestion proceeds, $CO_2$ is generated, and as stated previously, a comparatively large fraction of the $CO_2$ is evolved into the gas phase where it significantly reduces the oxygen concentration. In addition, the relatively high vapor pressure of water at the elevated temperature of the digester produces a significant water component in the aeration gas. The loss in driving force for mass transfer in the liquid phase due to reduced solubility of $O_2$ at elevated temperature compels an offsetting increase in driving force in the gas phase. Unfortunately, the foregoing $CO_2$ and $H_2O$ effects tend to diminish the gas phase driving force — exactly opposite the desired effect.

It should be recognized that $CO_2$ distribution between the liquid and gas phases in the digester will vary depending upon factors such as alkalinity, pH, actual temperature and $O_2$ utilization.

The digestion step is continued for sufficient duration to oxidize at least 60% and preferrably 80% of the biodegradable volatile suspended solids content (VSS) of the sludge introduced to the digestion zone. As used herein "biodegradable volatile suspended solids content" is essentially the maximum reduction in solids achievable by aerating the sludge with $O_2$-containing gas at ambient temperature, e.g., 20°C and DO of at least 2 mg/l. Maximum reduction of solids is assumed to be reached after 30 days aeration. Specifications for such determination are contained in "Water Pollution Control", Eckenfelder, W. W. and Ford, D. L., The Pemberton Press, 1970, Page 152. By determining VSS levels on the fresh sludge and again after 30 days aeration, the biodegradable fraction of the total VSS may be calculated as:

$$\frac{VSS_{(Fresh)} - VSS_{(30\ days)}}{VSS_{(Fresh)}}$$

It is preferred to oxidize at least 80% of the biodegradable volatile suspended solids of the sludge entering the digester. Broadly, at least 60% of the biodegradable VSS should be oxidized for reasons associated with minimum retention time, i.e., at least this fraction of the available VSS should be consumed in order that the heat generated offsets the cooling effect of the sludge passing through the digester. In addition, at least 60% should be oxidized to obtain reasonable stabilization of the sludge for disposal. At least 80% oxidation is preferred to further improve stability of the residue. In most practice, at least 80% oxidation can be achieved in 3–7 days retention time and will obtain maximum autothermal temperature in digestion.

Thereafter, the stabilized sludge residue is discharged either continuously or intermittently through bottom conduit 30 for further processing (e.g., dewatering) the disposal.

Oxygen-depleted digestion gas of at least 40% oxygen purity is discharged from covered warmed digestion zone 22 through conduit 12 at rate such that its oxygen content is at least 35% of the oxygen content of the oxygen feed gas entering through conduit 24. The gas in conduit 12 is introduced to covered aeration zone 10, as at least a major part of the aforementioned first gas supplying the oxygen requirement for biochemical oxygenation of wastewater. If needed, a supplementary external source of oxygen-containing gas may be supplied through conduit 31. It will be noted that the wastewater aeration zone feed gas may contain only 40% oxygen whereas the oxygen aeration systems described in the aforementioned patents require higher $O_2$ purity feed gas. This is because in the present invention at least the major fraction of the feed gas comprises the digestion zone off-gas which contains substantial quantities of $CO_2$ and $H_2O$, and these components are rapidly removed from the aeration gas in zone 10, as hereinafter explained.

Figure 2:
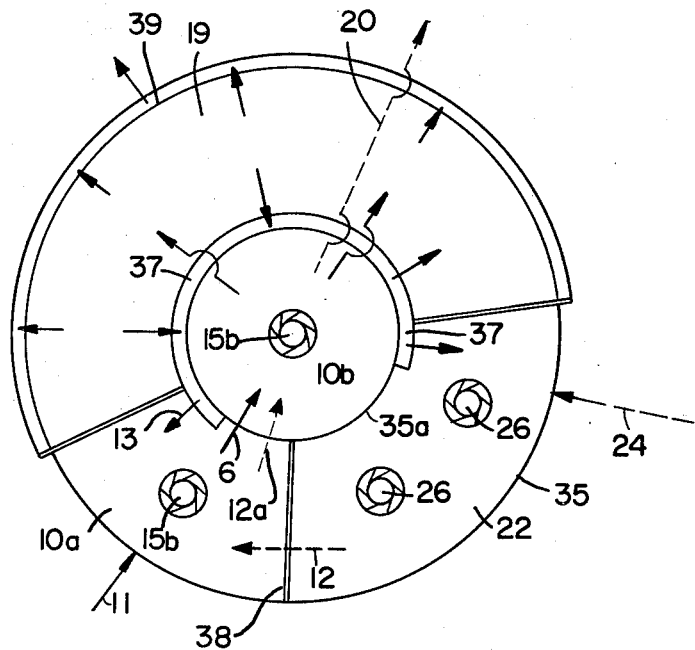
FIG. 2 is a schematic plan view looking downwardly on an integral circular wastewater treatment — sludge digestion plant also suitable for practicing the invention.

Additional $CO_2$ is generated in zone 10 as BOD is removed from the wastewater. Other gases, notably nitrogen, are also brought into the wastewater aeration zone in solution in the wastewater. Since feed gas entering through conduit 12 already contains a substantial fraction of diluent gas, one would expect further reduction of the oxygen concentration in the zone 10 aeration gas to a prohibitively low level. Instead, it has been found that the wastewater aeration gas in the region of feed gas introduction is substantially higher in oxygen purity than the feed gas. The reason the $O_2$ purity of the aeration gas increases above that of the feed gas is that $CO_2$ and water vapor are absorbed rapidly into the wastewater reactor liquor. The larger flow of relatively cool water in the wastewater aeration zone (compared to the digester) has a huge capacity for dissolving $CO_2$ and quickly reduces the $CO_2$ content of the incoming gas. The lower temperature of the water in the wastewater aeration zone causes it to exert a much lower vapor pressure than that in the digester, and the $H_2O$ content of the incoming gas is rapidly reduced by condensation. In FIG. 2, all of the elements previously described in connection with FIG. 1 are incorporated in a circular wastewater treatment-sludge digestion plant enclosed within circular wall 35. For purposes of clarity, the numerals used to identify certain elements in FIG. 1 are also used to identify corresponding elements in FIG. 2 and succeeding figures. The circular plant is described and claimed in patent application Ser. No. 347,398 filed Apr. 2, 1973 in the names of L. M. LaClair et al., incorporated herein to the extent pertinent. In brief, wastewater and first oxygen-containing gas are introduced to first arcuate aeration sub-zone 10a through conduits 11 and 12 respectfully. Activated sludge is also introduced herein at 13 through trough 37. After mixing by mechanical means 15a the liquor and partially oxygen-depleted aeration gas are separately transferred to second central circular wastewater aeration sub-zone 10b for further mixing and continuous recirculation of one fluid by means 15b. First and second sub-zones 10a and 10b are separated by circular inner wall 35a and openings are provided therethrough or thereunder for the gas and liquor flows 12a and 6, respectively. By way of example, if wall 35a extends to the covers, aeration gas may flow in staged manner from first sub-zone 10a to second sub-zone 10b through openings in the wall above the liquor level (see dotted line 12a through wall 35a). Unconsumed oxygen-containing gas is discharged from second central circular sub-aeration zone 10b through conduit 20, and the mixed liquor is directed by suitable unillustrated distributor means at the inner edge of arcuate clarifier zone 19 for flow thereacross to the outer wall 35 and separation into purified liquid discharged over wier 39, and activated sludge. A portion of the latter is returned by unillustrated means to trough 37 and introduction at 13 to first arcuate aeration sub-zone 10a. The balance of the sludge is introduced to arcuate digestion zone 22 for mixing with second oxygen-feed gas introduced through conduit 24. It should be noted that with the exception of arcuate clarifier zone 19, all of the previously described zones of the circular plant are covered. After digestion in the previously described manner, oxygen-depleted gas is discharged from covered arcuate zone 22 through conduit 12 and introduced as at least a major part of the oxygen-containing feed gas to first arcuate aeration sub-zone 10a and the stablized residue discharged through means not illustrated. If desired, supplementary oxygen gas may be introduced into sub-zone 10a.

The processes depicted in FIGS. 1 and 2 treat raw wastewater in wastewater aeration zone 10, with sufficient detention time to oxidize most of the biodegradable impurities in that step. Such mode of operation minimizes the oxygen requirement in the digester and also minimizes the "fuel" available to the digester. Mass transfer requirements are eased in the digester, but the autothermal temperature levels tend to be limited.

Figure 3:
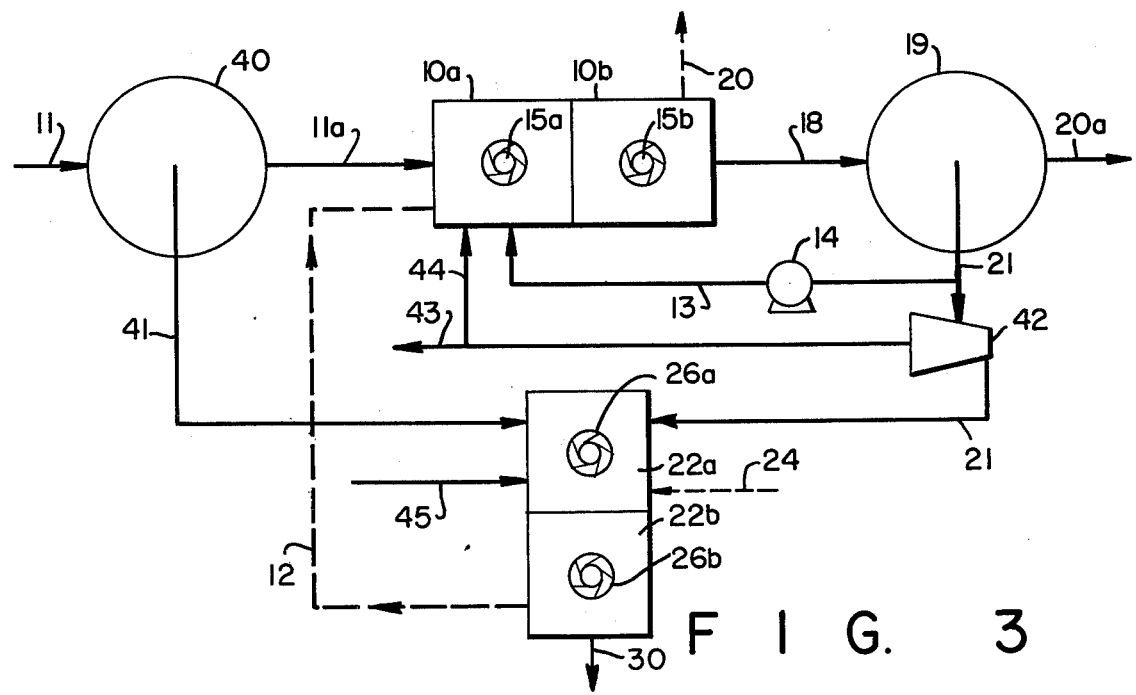
FIG. 3 is a schematic flowsheet of an alternative embodiment including a primary treatment zone for the wastewater, thickening of secondary treatment activated sludge prior to digestion, and external source augmentation of the biodegradable fuel supply to the sludge digestion zone.

FIG. 3 is an alternative embodiment of the invention employing a primary clarification zone 40 wherein a substantial fraction of the solids are preliminarily settled from the wastewater before treating the water in the aeration zone 10a—10b. All, or a selected portion of the primary sludge containing as much as 40% of the oxidizable impurities in the raw sewage and at a solids concentration ranging up to 6% (60,000 mg/l), is conducted directly to the covered digestion zone 22a—22b by conduit 41. In effect, the oxidizable material contained in the primary sludge bypasses treatment in wastewater aeration zone 10a—10b, and oxygen demand is shifted from the latter to the digester. The primary-treated wastewater entering zone 10a—10b through conduit 11a is then partially BOD-depleted. The primary sludge combines with the excess secondary sludge entering the digester from clarifier 19, and since primary sludge is normally more concentrated than secondary sludge, the solids level in the digester will increase. The more concentrated solids and the additional fuel in the digester are condusive to higher autothermal temperatures, and such higher temperatures achieve more rapid stabilization of the solids. In the wastewater aeration zone, retention time is shortened due to the reduced organic load, and the expenditure for tankage and mixing is less.

If desired, the excess secondary sludge from clarifier 19 may be dewatered and thickened prior to digestion. FIG. 3 provides such means in centrifuge 42 which increases the solids level of sludge in conduit 21 to perhaps 5% (50,000 mg/l). This is further conducive to high autothermal temperatures in the digester. The water separated in centrifuge 42 may be discarded through conduit 43 or preferably is returned by conduit 44 to the wastewater treatment first sub-zone 10a.

FIG. 3 also contains provisions for further augmenting the fuel supply to the digester 22a—22b by supplementary feed in conduit 45. Such supplementary feed is from a source external of the raw wastewater and may for example be ground garbage or concentrated waste material from an industry such as a dairy or slaughter house.

Figure 4:
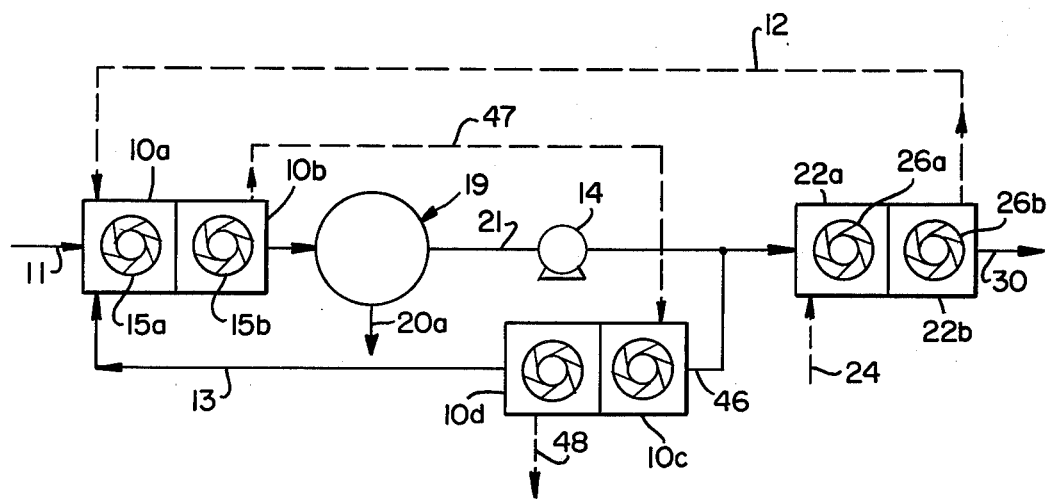
FIG. 4 is a schematic flowsheet of another alternative embodiment wherein the secondary treatment comprises a contact sub-zone and a stabilization sub-zone with the oxygen aeration gas flowing consecutively to the digestion zone, contact sub-zone, and stabilization sub-zone.

FIG. 4 is yet another embodiment of the invention employing the contact-stabilization mode of wastewater treatment. Reactors 10a—10b are the contact sub-zones of the wastewater aeration step and provide only sufficient time for contacting the water with the activated sludge to obtain a satisfactorily pure effluent in conduit 20a from clarifier 19 for diposal. Much of the oxidizable organic impurity is only physically adsorbed on the biomass and in this condition the water and sludge are separated in clarifier 19. The major portion of the concentrated sludge, "loaded" with degradable impurities (and in this sense, not activated), is transferred by conduit 46 to the stabilization sub-zones 10c — 10d where organic impurities are assimilated and the sludge is activated. The activated sludge is recycled to contact sub-zone 10a through conduit 13. The excess sludge undiverted to conduit 46 continues through conduit 21 to digester 22a — 22b.

The FIG. 4 system with three oxygen mixing zones offers considerable flexibility in designing the oxygen gas supply system. As shown in the drawing, the fresh oxygen feed gas is introduced to the digestion zone through conduit 24, and aeration gas of partially deplected oxygen content is transferred from the digestion final sub-zone 22b through conduit 12 to the contact sub-zone 10a where $CO_2$, $H_2O$ and additional $O_2$ are absorbed into the full-flow of wastewater. Aeration gas, further depleted of oxygen, is removed from the final contact sub-zone 10b through conduit 47 and transferred to the stabilization first sub-zone 10c where still more of its oxygen content is utilized. "Spent" aeration gas preferrably of at least 21% $O_2$ is vented from the stabilization final sub-zone 10d through conduit 48.

Because of the high content of $CO_2$ and $H_2O$ in aeration gas discharged from the digestion zone in conduit 12 and the rapid absorption of these constituents in wastewater contact sub-zone 10a, aeration gas in conduit 47 will often contain substantially higher percentages of $O_2$ than in conduit 12. Thus, there remains adequate concentration of $O_2$ in the aeration gas within wastewater aeration stabilization sub-zones 10c — 10d to obtain efficient mass transfer.

While the $O_2$ uptake rate in the wastewater aeration contact sub-zones 10a — 10b is normally high, the amount of oxygen consumed in these sub-zones can be quite low because of the short residence time. Thus, the total power required in the contact sub-zones are low relative to that required in the stabilization sub-zones or digestion zone.

As still another alternative, the oxygen-partially depleted aeration gas discharged from digestion zone 22 may be introduced to the wastewater aeration stabilization first sub-zone 10c rather than contact first sub-zone 10a. In this event, the oxygen-further depleted aeration gas discharged from stabilization final sub-zone 10d would be introduced to contact first sub-zone 10a. Despite the fact that liquor flow through the stabilization sub-zones is only a fraction (e.g., one-quarter) of the flow through the contact sub-zones, the flow through conduit 13 is nevertheless many times larger than that through the digester. Typically, the stabilization flow may be 25 to 200 times the digester flow — the factor depending in part upon whether a primary clarifier is employed. Therefore, the sludge in the stabilization sub-zone is essentially at feed water temperature, i.e., autothermal heat is dissipated with substantially no temperature increase and its volume is sufficient to absorb and retain most of the $CO_2$ generated in that zone. Consequently, the $O_2$ purity of the aeration gas decreases only moderately through the stabilization sub-zone compared to the digester. When aeration gas flows from the stabilization to the waste-water aeration contact sub-zone of this embodiment and enters 10a as transfer gas, the larger water volume absorbs $CO_2$ from the gas and usually the $O_2$ purity of the aeration gas within that sub-zone will be higher than that of the transfer gas.

Figure 5:
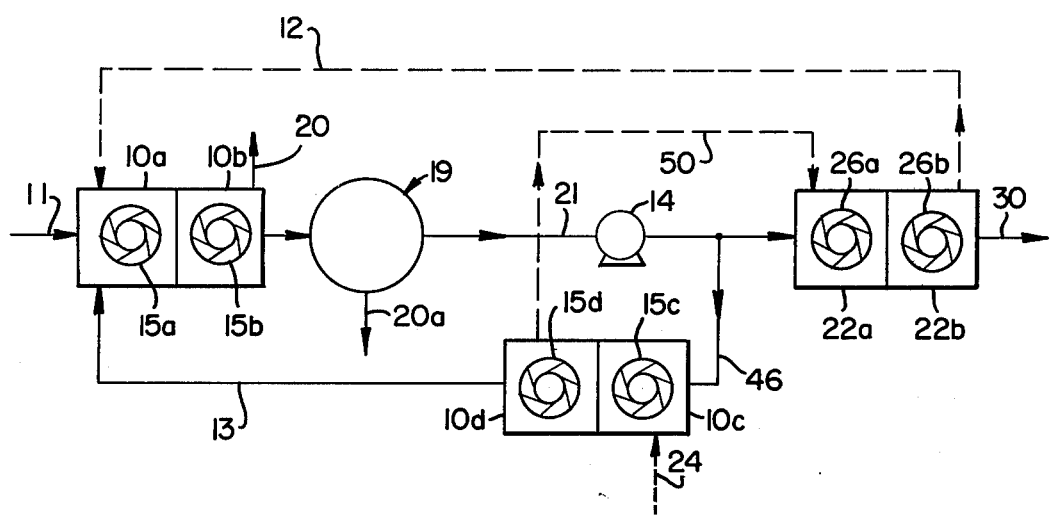
FIG. 5 is a schematic flowsheet of still another alternative contact-stabilization embodiment with the oxygen aeration gas flowing consecutively to the secondary stabilization sub-zone, the sludge digestion zone and the secondary contact sub-zone.

Yet another feasible arrangement of the oxygen supply system for the contact-stabilization form of wastewater aeration is shown in FIG. 5 wherein the fresh oxygen feed gas is introduced to the first stabilization sub-zone 10c, and the oxygen — partially-depleted aeration gas discharged from final stabilization sub-zone 10d through conduit 50 is passed next through digester 22 and finally by conduit 12 to contact first sub-zone 10a. Oxygen purities in the digester will be somewhat lower and power consumption higher, but the power increase is almost completely offset by the increase in $O_2$ purity and decrease in power in the stabilization sub-zone. Digester aeration gas in conduit 12 entering the contact sub-zone experiences a significant increase in $O_2$ purity.

As shown in FIGS. 4 and 5, it is preferred to divert the excess sludge to the digester from total sludge in conduit 21 at a point upstream of the stabilization sub-zone. However, it is feasible to stabilize the total sludge stream to be introduced to the digestion zone 22 would be diverted from the total activated sludge in conduit 13. The effect is to reduce the oxygen demand in the digestion zone and to increase the oxygen demand in the stabilization sub-zone.

In the practice of this invention, it is preferred (but not essential) to stage both the oxygen aeration gas and the liquid through at least two sub-zones within each the covered aeration zone and the warmed digestion zone, and in cocurrent gas-liquor flow as taught in the aforementioned McWhirter U.S. Pat. 3,547,815. Also multiple staged sub-zones are preferred in the warmed digester because they obtain faster, more complete oxidation of volatile suspended solids (VSS).

Figure 6:
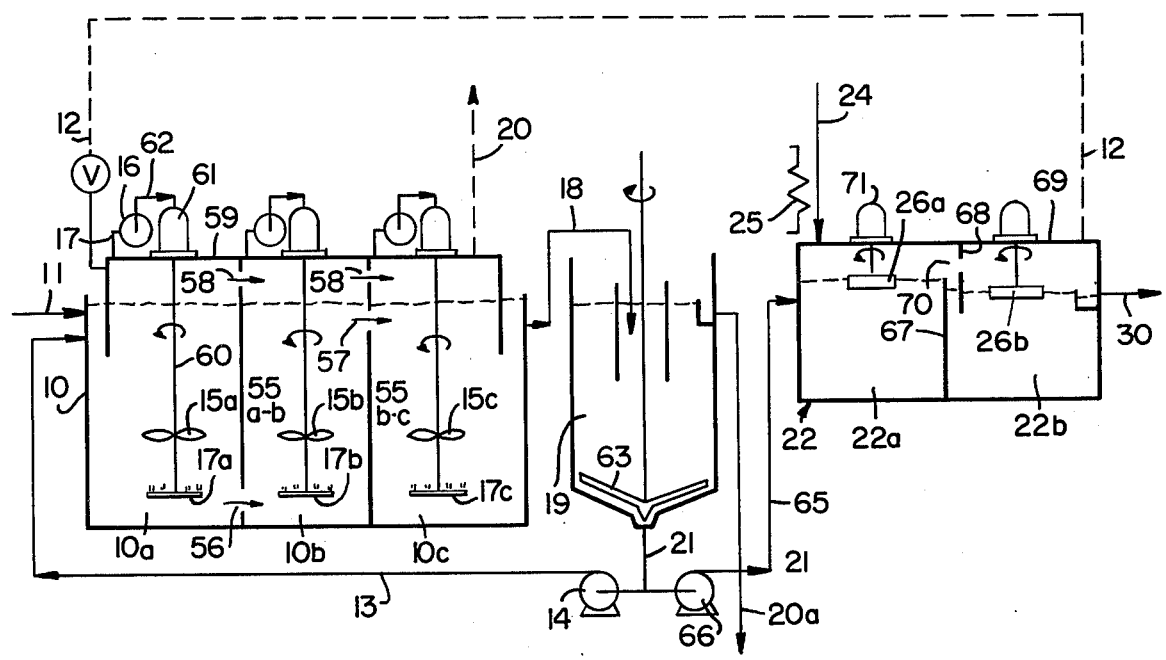
FIG. 6 is a schematic embodiment of a sludge digestion chamber with multiple compartments for staged cocurrent liquor and oxygen aeration gas flow, and suitable for use as the digestion zone in the FIGS. 1 and 3–5 embodiments.

FIG. 6 illustrates apparatus which can be used to practice the series staged cocurrent gas-liquor flow embodiment of the invention with certain apparent modifications, in any of the preceeding FIGS. 1–5.

The wastewater aeration zone 10 is in the form of a tank with vertical partitions 55a - b and 55b - c spaced to provide three compartments 10a, 10b and 10c as the aeration stages. These partitions extend substantially to the base of tank 10 and are joined thereto in fluid-tight relation. Oxygenated liquid-solid flow is provided by restricted flow opening 56 in the first-second compartment common partition 55ab preferably near or beneath the bottom thereof, and restricted opening 57 preferably in the upper portion of second-third compartment common partition 55b-c. The unconsumed oxygen-containing gas flows from compartment-to-compartment through restricted openings 58 near the top of the partition. The gas space above each compartment is enclosed by a common cover 59 to which the partition upper means are leak-tightly joined. Accordingly, back mixing of oxygen gas from a succeeding compartment to a preceding compartment is avoided as long as a slight pressure differential is maintained.

The mixing means for each compartment includes blades 15 submerged in the liquor and joined by a rotatable shaft 60 to suitable drive means such as motor 61. Fluid recirculation means comprises withdrawal conduit 17 joined to cover 59, pump 16, return conduit 62 in flow communication with the inlet side of hollow shaft 60 driven by motor 61, and sparger 17a positioned at the lower end of shaft 60 beneath blades 15a. The small oxygen gas bubbles discharged from the sparger 17a by the pressure of pump 16 are distributed through each compartment in intimate contact with the liquor and rise through the liquor to the surface where the unconsumed portion disengages into the gas space along with the oxidation reaction product gases.

The mixed liquor discharged from the third and final aeration compartment 10c through flow restricting conduit 18 is introduced to clarifier 19 for separation into supernatent liquid and activated sludge. Clarifier constructions are well-known to those skilled in the waste treatment art and may for example include rotatable scraper 63 at the lower end to aid thickening and to prevent coning. The activated sludge is withdrawn through bottom conduit 21 and at least 85 percent by weight thereof is recycled through pump 14 in conduit 13 to first oxygenation compartment 10a for mixing with the BOD-containing feed water and oxygen-containing feed gas. The purified liquid is discharged from clarifier 19 through conduit 20a.

The unreturned activated sludge is flowed through branch conduit 65 by pump 66 to digestion zone 22 in the form of a tank with lower vertical partition 67 and spaced upper vertical partition 68 dividing the tank into two compartments 22a and 22b This sludge flow to and through digestion zone 22 may be continuous so that when multiple stages are employed, back-mixing of liquid across restricted openings is desirably inhibited. As previously indicated, the liquid-solid contact time in digestion zone 23 is long as compared to the corresponding time in aeration zone 10, for example 3–10 days versus 1–2 hours. Moreover the volumetric flow rate of liquid introduced to the digestion zone is very low compared to the liquid introduction rate to the aeration zone, e.g., the former is often less than 5 percent of the latter. Consequently the restricted openings between stages of a multistaged digestion zone are relatively small in order to develop sufficient pressure difference across the openings to prevent back-mixing. Small openings are however prone to become plugged, and provision should be made to clean such openings without interrupting operation.

The digestion zone 22 construction of FIG. 6 avoids possible plugging of openings for interstage transfer of partially digested sludge. The sludge level in second stage 22b is lower than the level in first stage 22a, and lower vertical partition 67 acts as a wier over which the sludge must fall in its passage from 22a to 22b. Gas staging is provided by upper vertical partition 68 extending downwardly from the gas-tight cover 69 over the tank into the sludge. Restricted opening 70 in upper vertical partition 68 permits flow of unconsumed oxygen-containing gas from first compartment 22a to second compartment 22b without back-mixing.

Instead of separate liquid-mixing means and fluid recirculation means as employed in the wastewater aeration tank, rotating surface type impellers 26a and 26b are provided for each compartment in the digestion tank 22. Each impeller is joined by a shaft to power means as for example an electric motor 71. The rotating impellers keep the solids in suspension and also throw massive sheets of liquid-solids against the oxygen gas in the overhead space beneath cover 69. In this manner, the liquid-solid is continuously recirculated against the liquid-solid. If desired the shaft to impellers 26a and 26b may be extended downward to submerged turbines or propellers to aid solids mixing. It should be appreciated that two types of mixing and fluid recirculation apparatus are included in FIG. 6 for purposes of illustration, and either type could be used in both the aeration and digestion tank.

As previously indicated, this invention offers substantial savings in power consumption as compared with prior art systems. In the ensuing comparisons, power requirement data reflects the use of power for oxygen dissolution in liquor and does not include extraordinary power which in some instances may be needed to stir the tank and produce homogeneous solids and DO levels throughout the liquor. The requirement for extra mixing energy depends upon variant, unpredictable factors such as tank geometry, specific type of device used for oxygen dissolution, the presence of surfactants in the wastewater, and the type (density) of solids to be mixed.

EXAMPLE I

Figure 9:
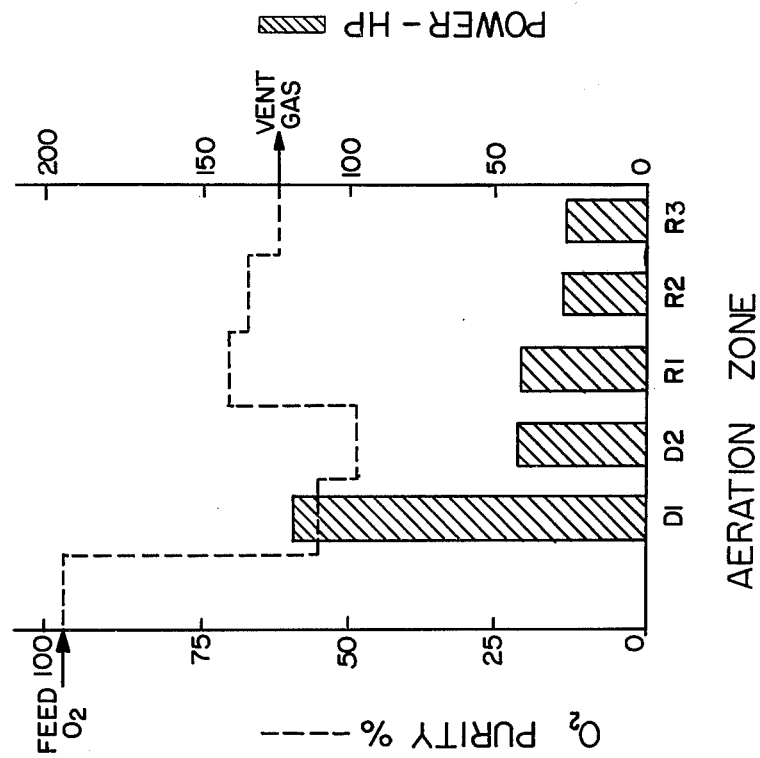
FIG. 9 is another graph similar to FIGS. 7 and 8 but based on series flow of the entire oxygen supply first to the warm digestion zone and then to the aeration zone, in accordance with this invention.

The advantages of the invention are illustrated in FIG. 7, 8 and 9 herein which display operating conditions through a facility consisting of a 3-stage cocurrent gas-liquor flow wastewater aeration zone as described in U.S. Pat. 3,547,815, and a 2-stage cocurrent gas-liquor flow aerobic digestion zone, all as illustrated in FIG. 6, together with a primary clarifier arranged as shown in FIG. 3. Conditions assumed for this comparison were:

| | |
|---|---|
| Raw wastewater flow | 10 MGD |
| DO in wastewater aeration zone | 6 mg/l |
| Raw wastewater $BOD_5$ to wastewater aeration zone | 200 mg/l |
| Wastewater $BOD_5$ to wastewater aeration zone | 140 mg/l |
| $BOD_5$ removal in wastewater aeration zone | 90% |
| Wastewater aeration temperature | 20°C |
| Primary sludge: | |
|     TSS | 40,000 mg/l |
|     Flow to digestion zone | 0.0300 MGD |
| Secondary excess sludge: | |
|     TSS | 20,000 mg/l |
|     Flow to digestion zone | 0.0630 MGD |
| DO in digestion zone | 2 mg/l |
| VSS reduction in digestion | 90% (Biodegradables) |
| $\alpha$ in digestion | 0.6 |
| Digestion temperature | 60°C |
| $O_2$ feed purity | 98% |
| Overall $O_2$ Utilization | 75% |

The $\alpha$-value in the above listing is essentially a correction factor for the mass transfer coefficient $K_L a$ and represents the disparity in this factor between tap water at 20°C and the particular sludge undergoing digestion at elevated temperature.

FIG. 7, 8 and 9 show the distribution of $O_2$ purities and dissolution power consumption through the system for various arrangements of $O_2$ supply. FIG. 7 represents separate $O_2$ supplies and separate gas venting from the wastewater aeration zone (with sub-zones $R_1$, $R_2$ and $R_3$) and the digestion zone (with sub-zones $D_1$ and $D_2$). The division of the oxygen between the two steps is adjusted to minimize overall power while still maintaining overall $O_2$ utilization of 75%. FIG. 8 represents series flow of the entire $O_2$ supply first to the wastewater aeration zone and then to the warm digestion zone. Power consumption in FIGS. 7–14 is only that associate with $O_2$ dissolution; any extra power requirement for mixing in excess of dissolution requirements are not included.

With reference to FIG. 7, it should be noted that when $O_2$ feed to the digester is limited to only the $O_2$ requirements in the digester, the aeration gas purity drops abruptly to below 50%. The loss of $O_2$ partial pressure in the gas phase coupled with low solubility of $O_2$ at elevated temperature, requires inordinately high power consumption for dissolution in the digester. Total dissolution power required in both steps is 366 HP.

In FIG. 8, $O_2$ mass transfer is improved in the wastewater reactor but at the expense of the digester. Despite the fact that a greater quantity of $O_2$ enters the digester compared to FIG. 7, its purity is lower and at elevated temperature, digester power consumption is even higher. Power savings in the wastewater aeration zone are almost fully offset by power increase in the digestion zone such that total dissolution power remains high at 364 HP.

In FIG. 9 illustrating this invention, the drop in $O_2$ purity as the feed $O_2$ enters the digestion first stage $D_1$ is less severe than in FIG. 7 and 8 and aeration gas purity is well above 50%. Moreover, the further drop in purity in digestion second stage $D_2$ is comparatively less. As the gas with partially-consumed $O_2$ content leaves the digestion zone after $D_2$ and enters the wastewater aeration first stage at $R_1$, and abrupt increase in aeration gas purity from about 50% to about 70% $O_2$ is observed. The enhancement in $O_2$ purity is due to rapid absorption of $CO_2$ and to condensation of water, and results in adequate partial pressure of oxygen in $R_1$ to satisfy the high $O_2$ uptake rate in that stage without undue power requirement. Total dissolution power required in both steps is 262 HP. It should also be noted that after transit of the aeration gas through all three stages of wastewater aeration zone, the vent gas purity is still higher than that of the gas entering $R_1$. Summarizing the FIG. 7–9 comparison, this invention provides a dissolution energy power savings of about 28% by means of a significantly higher oxygen partial pressure driving force in the elevated temperature digestion zone.

EXAMPLE II

Figure 10:
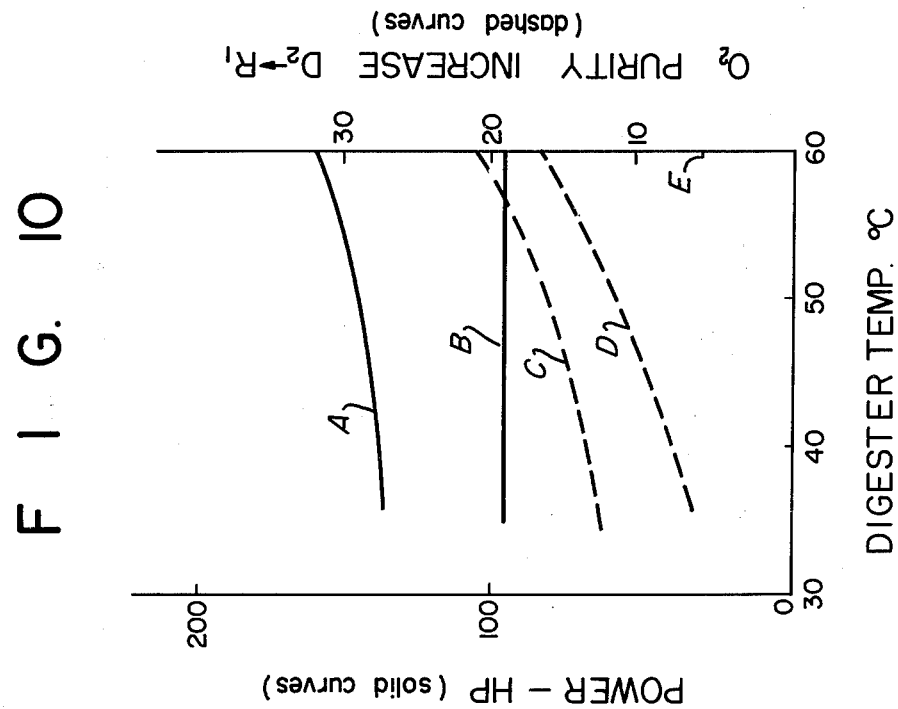
FIG. 10 is another graph showing the effect of different digestion zone temperatures on the power requirements.

FIG. 7, 8 and 9 are based on a relatively high digestion zone temperature of 60°C where the mass transfer problem in the digester tends to be quite acute. FIG. 10 shows the effect of different digestion zone temperatures on the dissolution power requirements in the two process steps described in FIG. 9. Except for digestion temperature, all conditions assumed for FIG. 9 remain unchanged. As the digestion temperature is reduced from 60°C, curve A shows that the dissolution power requirement drops in the digestion zone due largely to the increase in $O_2$ solubility and the reduction in the vapor pressure of water. However, the dissolution power requirement in the wastewater aeration zone (curve B) remains virtually unaffected by temperature changes in the digester. The vertical displacement of curves A and B demonstrates the relative difficulty in supplying dissolved $O_2$ to the two process steps. If primary sludge were not bypassed around wastewater aeration to the digester, the curves would be much closer together reflecting a shift of BOD from the digester to the reactor. Curve C of FIG. 10 shows how digestion zone temperatures affects the change in $O_2$ purity observed between the gas of the final digestion subzone and the gas of the initial wastewater aeration sub-zone. While the purity enhancement is appreciable throughout the temperature range of FIG. 10, the effect becomes more pronounced as the digestion temperature increases.

Curve D of FIG. 10 is based on the same set of parameters as curve C, except that no primary clarifier is employed, i.e., for the situation where primary sludge is not produced and bypassed around the wastewater aeration zone. In general, the oxygen purity jump from the digestion to the wastewater aeration zone is not as pronounced when primary clarification is not used.

Point E is based on a single stage digestion zone operating at 60°C and a single stage wastewater aeration zone, in contrast with the previous comparisons based on multi-staged zones. Point E is for a facility without primary clarifier and with a wastewater BOD similar to that of the primary effluent treated in the facility of curve C. The parameters are as follows:

| | |
|---|---|
| Wastewater aeration temperature | 20°C |
| Raw wastewater flow | 10 MGD |
| Raw wastewater $BOD_5$ | 150 ppm |
| DO in wastewater aeration zone | 6 mg/l |
| BOD removal in wastewater aeration | 90% |
| Secondary excess sludge | |
| TSS | 25,000 ppm |
| Flow to digestion | 0.053 MGD |
| DO in digestion zone | 2 mg/l |
| VSS reduction in digestion | 90% (Biodegradable) |
| $\alpha$ in digestion | 0.6 |
| Digestion temperature | 60°C |
| $O_2$ feed purity | 98% |
| Overall $O_2$ utilization | 75% |

EXAMPLE III

The advantages of the invention as applied to contact-stabilization can also be illustrated graphically. As stated previously, a number of variations are possible — some being more advantageous than others. To some extent, preference among alternatives will depend upon operating conditions for each specific case.

In the contact-stabilization type of wastewater aeration zone, the total oxygen requirement in the contact subzone can be quite low because of short retention time. While the rate of oxygen uptake is usually high in the contact subzone, the fraction of the total dissolution power consumed in that sub-zone is usually low and the adverse effect of a relatively low oxygen partial pressure is tolerable.

In the stabilization sub-zone, residence time is longer than the contact sub-zone, and it is here that the BOD which was merely absorbed physically on the biomass in the contact sub-zone must be oxidized. Consequently, oxygen requirements are substantial in this step. Moreover, for the same total aeration volume (contact sub-zone plus stabilization sub-zone), a larger fraction of the sludge will be auto-oxidized compared with the normal arrangment of the activated sludge system. In effect, a part of the solids reduction duty otherwise accomplished in a diigestion zone associated with the conventional undivided aeration zone arrrangement is transferred to the stabilization sub-zone when the contact-stabilization arrangement is employed. Correspondingly, less oxygen is required in the digestion zone and more is required in the stabilization sub-zone.

Another distinctive feature of contact-stabilization is the reduced water flow in the stabilization sub-zone. While liquid flow through stabilization is much higher than through the digestion zone, it is nevertheless considerably lower than through the contact sub-zone. By way of illustration, assume that the wastewater feed rate and recycle rate are 100 volumes and 30 volumes per unit time, respectively. Assume further that the excess sludge is 1.5% of the total sludge separated in the clarifier. Fur such case, the flow rate through the stabilization sub-zone is about 66 times that through the digestion zone. The result is, that while solids level and auto-oxidation are high in the stabilization sub-zone, elevated temperatures are not obtained autothermally at this point because the liquid throughput is far greater than in the digester. Thus, the solubility limit of oxygen is still high and water does not exert a severe partial pressure. On the other hand, the smaller liquid flow through stabilization will tend to shift more $CO_2$ from the liquid phase to the gas phase, compared to the contact sub-zone, thereby suppressing $O_2$ partial pressure. The KLa value also tends to be lower in thick sludge of the stabilization sub-zone than in the mixed liquor of the contact sub-zone.

In view of the above factors, the stabilization sub-zone will usually be characterized by high oxygen consumption and by conditions for mass transfer less favorable than in the contact sub-zone but more favorable than in the digestion zone. Therefore, power consumption in the stabilization sub-zone is an important factor. Measures taken to enhance mass transfer in the digestion zone must give due consideration to their influence on the stabilization sub-zone.

FIGS. 11–14 show oxygen purity and dissolution power profiles through four arrangements of an integrated oxygen system combining contact-stabilization with an elevated temperature digester. The contact and stabilization sub-zones each comprise two cocurrent gas-liquid flow stages as does the digestion zone. Conditions assumed for this comparison are:

| | |
|---|---|
| Wastewater flow | 10 MGD |
| Wastewater aeration temperature | 20°C |
| Wastewater $BOD_5$ | 150 mg/l |
| DO in contact and stabilization | 6 mg/l |
| Sludge recycle rate | 3 MGD |
| Sludge TSS | 20,000 mg/l |
| Sludge to digester | 0.034 MGD |
| VSS reduction in digestion | 90% (Biodegradable) |
| Digestion temperature | 45°C |
| $\alpha$ in stabilization | 0.6 |
| $\alpha$ in digestion | 0.6 |
| $O_2$ feed purity | 98% |
| Overall $O_2$ utilization | 75% |

The assumed conditions tend to ease the mass transfer problem in the digestion in two ways. First, the digestion temperature (45°C) is lower than assumed in previous illustrations (60°C). Second, a primary clarifier is not employed. For purposes of this Example III, easing conditions in the digester is done intentionally in order to emphasize the role of the stabilizer sub-zone and the need to select the oxygen system to suit specific conditions.

In the graph of FIG. 11, the sequence of steps served by the $O_2$ system is: first, digestion (sub-zones $D_1$, $D_2$); second, contact sub-zone (sub-zones $C_1$, $C_2$); and third, stabilization sub-zone (sub-zones $S_1$, $S_2$). It is apparent from the graph that the mass transfer problem in the digester is effectively solved. Introducing all the oxygen to the digester obtains high $O_2$ purity and low dissolution power in the digester nearly equal to values in the contact sub-zone. An increase in $O_2$ purity is still observed between $D_2$ (second stage of digestion) and $C_1$ (first stage of contact sub-zone). However, it is seen that a mass transfer problem has now developed in the stabilization sub-zone due in large part to the low $\alpha$-value, high $O_2$ requirement and lower $CO_2$ absorbing capacity of reduced liquid flow. Not only is there a reduced absorbing capacity for the $CO_2$ produced in the stabilization sub-zone, but the liquid entering the stabilization sub-zone contains less then 50% of the $CO_2$ produced in the digester and contact sub-zone. The total required energy for oxygen dissolution is 192 HP.

Although the stabilization sub-zone presents a mass transfer problem in FIG. 11, the situation is nevertheless better than would occur if the digester were transposed from first to last position in the $O_2$ system. Such arrangement is illustrated for comparison in FIG. 12. Oxygen purity in the digester now drops well below 50% and power consumption rises dramatically in that step. Since the contact sub-zone precedes the digester, there is no opportunity to reject $CO_2$ produced in the digester into the full flow of wastewater. Consequently, an enhancement in $O_2$ purity of the aeration gas is not observed anywhere in the $O_2$ system and the toatl required energy for dissolution is 208 HP.

For the specific conditions assumed in this comparison, FIG. 11 is not the best arrangement for the oxygen system in the practice of this invention. FIGS. 13 and 14 are better arrangements wherein both the digestion zone and stabilization sub-zone precede the contact sub-zone. In FIG. 13, the stabilization sub-zone is placed first in the $O_2$ aeration gas flow sequence in order to maximize $O_2$ purities and minimize dissolution power in that step. The transfer gas, $S_2 \rightarrow D_1$ leaves stabilization zone $S_2$ at about 75% $O_2$ and upon entering and mixing with the gas in the digester, the purity drops abruptly to about 55% in $D_1$ and near 50% in $D_2$. Normally, such gas would be of questionable quality for use as a feed gas to the contact sub-zone step. However, its high content of readily absorbable components results in a purity enhancement to 70% $O_2$ upon entering and mixing with gas in $C_1$. Consequently, power consumption in the contact step is not excessive and the total required energy for dissolution is 186 HP.

In FIG. 14, the positions of the digestion zone and the stabilization sub-zone are interchanged with respect to FIG. 13. Now the $O_2$ purity and power consumption in the contact sub-zone are nearly the same as in FIG. 13. In the stabilization sub-zone, $O_2$ purities are somewhat lower than for FIG. 13 and power somewhat higher.

FIG. 14 shows that the contact sub-zone need not follow the digester immediately in order to realize an enhancement in $O_2$ purity. In this case, the purity enhancement between source and receiver of the transfer gas $S_2 \rightarrow C_1$ does not represent any significant change in water content inasmuch as both the stabilizer and contactor are at virtually the same low temperature. The purity enhancement is due to $CO_2$ absorption. The total $CO_2$ in stage $S_2$ (liquid and gas phases) is not only that which was produced in the stabilization sub-zone, but in addition, includes a substantial amount carried over from the digester. As stated previously, the liquid flow through the stabilizer is a small fraction of the wastewater flow rate and its $CO_2$ absorbing capacity is limited. Therefore, a substantial reduction in $CO_2$ content of the gas occurs as it first contacts the liquid in $C_1$. The total required energy for dissolution is about 183 HP, the lowest of the FIGS. 11–14 systems.

With further reference to FIG. 14, it is noted that with a higher digester temperature, e.g., 60°C, a more pronounced effect on $O_2$ purity would be observed between source and receiver of the transfer gas $D_2 \rightarrow S_1$ due to water absorption. Gas purity in the digester would be appreciably lower than depicted in FIG. 14 while gas purity in the stabilization sub-zone would be effected to lesser degree. Thus, it is possible to observe a dual enhancement in $O_2$ purity between source and receiver sub-zones, first for the transfer gas $D_2 \rightarrow S_1$, and second for the transfer gas $S_2 \rightarrow C_1$.

If a primary clarifier were used in the FIGS. 11, 13 and 14 embodiments, BOD would bypassed around the contact-stabilization zone directly to the digestion zone. Oxygen dissolution requirements would shift from the stabilization sub-zone to the digestion sub-zone, and preference would also shift towards those embodiments which place the digester first in the oxygen aeration gas flow sequence. Whereas with no primary clarifier FIGS. 13 and 14 are preferred relative to FIG. 11, with a primary clarifier FIGS. 11 and 14 would be superior to FIG. 13.

EXAMPLE IV

The effect of variation of the wastewater aeration zone temperature on the digestion-to-wastewater aeration zone oxygen gas purity differential is illustrated in a series of simulated experiments summarized in FIG. 15. The system comprises three wastewater aeration sub-zones (without contact stabilization) and two digestion sub-zones, both in staged cocurrent gas-liquor flow with partially oxygen-depleted aeration gas from the second digestion sub-zone flowing to the first wastewater aeration sub-zone. There is no primary clarifier. It was assumed for these calculations that the wastewater aeration zone design was fixed for a predetermined BOD removal rate (90%) based on 20°C wastewater aeration zone liquor temperature. Seasonal changes of course occur in wastewater feed temperature and consequently in liquor temperature, and therefore wastewater feed temperature was treated as a variable imposed upon the fixed-size wastewater aeration zone. When this occurs the BOD removal rate also changes. In addition, the production of excess sludge from the wastewater aeration zone will change thereby imposing a variable VSS (volatile suspended solids) load on the digestion zone. Despite this variable load on the digestion zone the calculations for this Example IV assume a fixed 40% VSS removal on the digestion zone which in effect allows the size of the digester to vary. Other assumptions for the data were as follows:

| CUZ,1/5 Fixed | |
|---|---|
| Raw wastewater flow | 10 MGD |
| DO in wastewater aeration zone | 6 mg/l |
| Raw wastewater $BOD_5$ | 250 mg/l |
| Raw wastewater alkalinity (as $C_aCO_3$) | 250 mg/l |
| $BOD_5$ removal in wastewater aeration zone (at 20°C only) | 90% |
| Secondary excess sludge, TSS | 25,000 mg/l |
| VSS reduction in digestion zone | 90% (biodegradable) |
| DO in digestion zone | 2 mg/l |
| $\alpha$ in digestion | 0.6 |
| $O_2$ feed purity | 98% |
| Overall $O_2$ utilization | 75% |
| Variable | |
| Wastewater aeration temperature (WT) | 15,20,25,30°C |
| $BOD_5$ removal in wastewater aeration zone | Variable with WT |
| Secondary sludge flow to digestion zone | Variable with WT |
| Temperature differential of aeration gas, digester-to-wastewater aeration zone ($\Delta T$) | 0,10,20,30°C |
| Digestion zone temperature | $WT + \Delta T$ |

Examination of FIG. 15 reveals that at a wastewater aeration zone liquor temperature of 15°C, the oxygen gas purity increase (above 0) does not appear until the temperature differential ($\Delta T$) between the warm digestion zone and the wastewater aeration zone is at least 10°C, thereby supporting the lower limits of the invention in this respect. It is also significant to note that with higher wastewater aeration zone liquor temperatures up to a crossover $\Delta T$ region of about 21°–27°C, greater temperature differentials are required to achieve the desired oxygen gas purity increase. FIG. 15 also shows that for consistent operation with the desirable purity enhancement between the gas vent region of the digester and the gas feed region of the wastewater aeration zone, the digestion zone should be maintained at least at 40°C and at least 20°C warmer than the wastewater aeration zone.

EXAMPLE V

FIG. 16 summarizes a series of data based on the FIG. 15 conditions except that alkalinities of 250 and 50 mg/l are shown for selected values of wastewater aeration zone liquor temperature, i.e., 15°C and 30°C. By way of comparison, the alkalinity in Examples I–IV was about 240 mg/l unless otherwise noted. For each pair of curves at the same temperature in FIGS. 16 and 17, the top curve is for alkalinity of 250 mg/l and the bottom curve for alkalinity of 50 mg/l. It is evident that the desired increase in oxygen purity between the digestion and wastewater aeration gas is favored by high alkalinity. For example, at liquor temperature of 30°C and $\Delta T$ of 25°C the $O_2$ purity increase of the 50 mg/l alkalinity curve is about 2% but the increase for the 250 mg/l alkalinity curve is about 4%.

EXAMPLE VI

Figure 17:
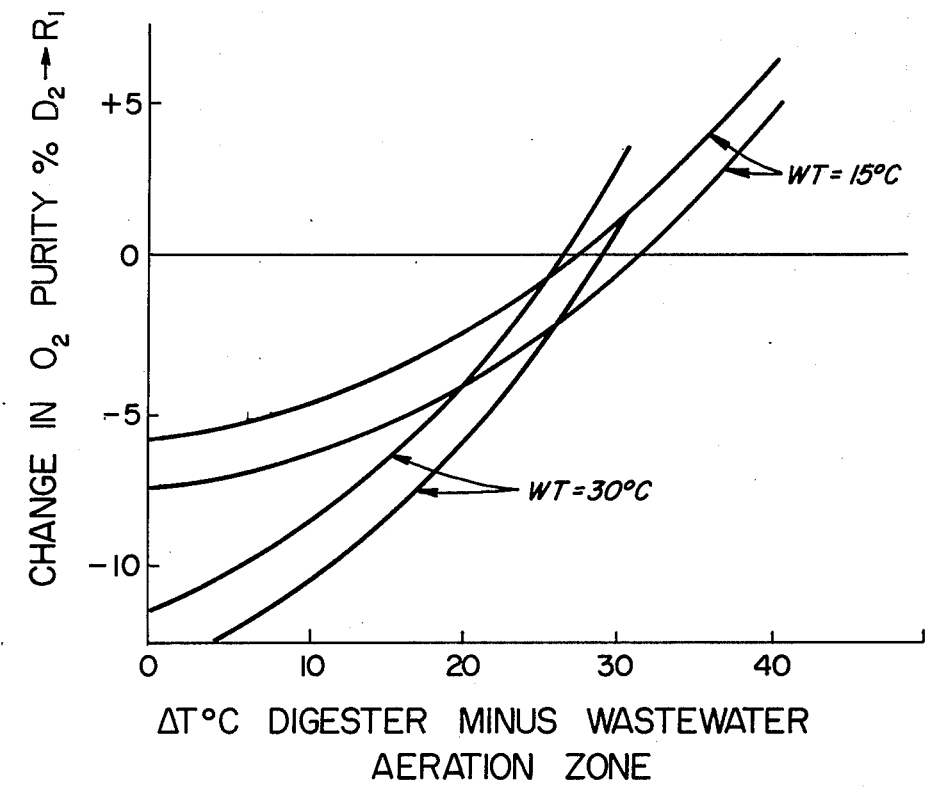
FIG. 17 is a graph similar to FIG. 16 but showing the effect of BOD removal requirements in the wastewater aeration zone on the aforementioned oxygen gas purity differential.

FIG. 17 summarizes another series of data based on the FIG. 16 conditions and assumptions except that BOD removal in the wastewater aeration zone is 95% at a liquor temperature of 20°C. In Examples IV and V, BOD removal was 90% at 20°C.

Comparison of FIG. 17 to FIG. 16 reveals that the effect of increasing the BOD removal requirement in the wastewater aeration zone is to increase the $\Delta T$ at which the $D_2 \rightarrow R_1$ increase in oxygen purity appears, and the $\Delta T$ is greater at lower BOD removal requirements. By way of example, a 5% $O_2$ purity increase occurs for 90% BOD removal at wastewater aeration zone temperature of 30°C, alkalinity of 50 mg/l and $\Delta T$ of 30°C. In comparison, FIG. 17 shows a 1% $O_2$ purity increase occurs for 95% BOD removal at the same wastewater aeration zone temperature, alkalinity and $\Delta T$.

EXAMPLE VII

Whereas multiple sub-zones are preferably employed for wastewater aeration and digestion in the practice of this invention, the invention also provides significant power savings when single-stage zones are used. This example represents a comparison based on the Example I conditions for three oxygen aeration gas supply systems serving a single stage wastewater aeration zone and a single stage digestion zone. The three oxygen gas supply arrangements are: (a) separate feed gases with the division of oxygen aeration gas adjusted for minimum power; (b) all oxygen gas introduced first to the wastewater aeration zone and aeration gas transferred therefrom to the warmed digestion zone, and (c) all oxygen gas introduced first to the warmed digestion zone and aeration gas transferred therefrom to the waste-water aeration zone (this invention).

|  | Wastewater Aeration $O_2$ Purity % | HP | Digestion $O_2$ Purity % | HP |
|---|---|---|---|---|
| (a) Separate $O_2$ feeds Total Dissolution Power 243 HP | 58.7 | 121 | 35.4 | 122 |
| (b) $O_2$ from wastewater aerator to digester Total Dissolution Power 205 HP | 79.1 | 83 | 35.4 | 122 |
| (c) $O_2$ from digester to wastewater aerator Total Dissolution Power 163 HP | 67.5 | 101 | 62.1 | 62 |

In this example, the invention affords a 5.4% $O_2$ purity jump and a 20% dissolution power energy saving.

Although certain embodiments have been described in detail, it will be appreciated that other embodiments are contemplated along with modifications of the disclosed features.

What is claimed is:

1. In a method for BOD-removal from wastewater in a covered aeration zone and activated sludge in a covered digestion zone by aeration with oxygen gas, the improvement comprising:
   a. introducing first gas comprising at least 40% oxygen (by volume) and mixing same as the aeration gas with the wastewater and recycled sludge in said covered aeration zone to form mixed liquor and simultaneously continuously recirculating one of such fluids against the other fluids in the aeration zone in sufficient quantity and rate to maintain the dissolved oxygen content (DO) of the mixed liquor at least at 0.5 mg/l, with the mixed liquor temperature at least 15°C, separating the mixed liquor into purified liquid and activated sludge, and discharging unconsumed oxygen-containing gas from the aeration zone at rate such that its oxygen content is not more than 40% of the total oxygen introduced to the digestion zone;
   b. returning at least about 85% by weight of the activated sludge to the aeration zone as said recycled sludge;
   c. providing second gas comprising at least 80% oxygen (by volume) and including part of said first gas;
   d. introducing said second gas and the unreturned activated sludge from step (b) to the digestion zone, mixing same and simultaneously recirculating one of such fluids against the other fluids in the digestion zone in sufficient quantity and rate to maintain the dissolved oxygen content of sludge at least at 2 mg/l and the total suspended solids content (MLSS) of the sludge at least at 15,000 mg/l.
   e. maintaining the sludge in the digestion zone during step (d) at temperature of at least 25°C and also at least 10°C warmer than the mixed liquor temperature in step (a) but below 75°C;
   f. continuing step (e) for sufficient solids retention time (duration) to oxidize at least 60% of the biodegradable volatile suspended solids content of the sludge introduced to the digestion zone, and thereafter separately discharging stabilized sludge residue and oxygen-partially depleted digestion gas of at least 40% oxygen purity at rate such at its oxygen content is at least 35% of the oxygen content of said second gas entering the digestion zone; and
   g. providing said oxygen-partially depleted digestion gas from step (g) as at least the major part of said first gas introduced step (a).

2. A method according to claim 1 wherein the second gas of step (c) is heated before introduction to the digestion zone.

3. A method according to claim 1 wherein the solids retention time in the digestion zone is 3–10 days.

4. A method according to claim 1 wherein part of the solids contained in the wastewater is preliminarilly separated and introduced directly to the digestion zone.

5. A method according to claim 1 wherein the sludge in the digestion zone is maintained at least 20°C warmer than the wastewater aeration zone liquor temperature.

6. A method according to claim 1 wherein at least 80% of the biodegradable volatile suspended solids content of the sludge introduced to the digestion zone is oxidized during step (f).

7. A method according to claim 1 wherein said wastewater aeration zone comprises a preliminary contact sub-zone and a stabilization sub-zone, mixed liquor is discharged from said contact sub-zone after preliminary mixing and recirculation of one fluid against the other fluids and separated into purified liquid and oxygen-contacted sludge, said oxygen-contacted sludge is introduced to said stabilization sub-zone for further mixing and recirculation of one fluid against the other fluids; said oxygen-partially depleted digestion gas from step (f) is introduced to said contact sub-zone as said first gas, and oxygen-further depleted gas is discharged from said contact sub-zone and introduced to said stabilization sub-zone as said first gas.

8. A method according to claim 1 wherein said wastewater aeration zone comprises a preliminary contact sub-zone and stabilization sub-zone, mixed liquor is discharged from said contact sub-zone after preliminary mixing and recirculation of one fluid against the other fluids and separated into purified liquid and oxygen-contacted sludge, said oxygen-contacted sludge is introduced to said stabilization sub-zone for further mixing and recirculation of one fluid against the other fluids; said oxygen-partially depleted digestion gas from step (f) is introduced to said stabilization sub-zone as said first gas; and oxygen-further depleted aeration gas is discharged from said stabilization sub-zone and introduced to said contact sub-zone as said first gas.

9. A method according to claim 1 wherein the digestion zone has a surface-to-volume ratio less than 0.8 ft$^2$/ft$^3$.

10. A method according to claim 1 wherein the total suspended solids content (MLSS) of the sludge in the digestion zone is at least 20,000 mg/l.

* * * * *